United States Patent [19]

Miller, Jr., et al.

[11] Patent Number: 4,461,575
[45] Date of Patent: Jul. 24, 1984

[54] REFERENCE MARKER/CORRELATION SCHEME FOR OPTICAL MEASUREMENTS

[75] Inventors: Warren H. Miller, Jr.; Wilson E. Taylor, both of Palm Bay, Fla.

[73] Assignee: Harris Corporation, Melbourne, Fla.

[21] Appl. No.: 303,181

[22] Filed: Sep. 17, 1981

[51] Int. Cl.³ ............................................. G01B 11/10
[52] U.S. Cl. .................................... 356/386; 250/560; 358/107
[58] Field of Search ............... 356/375, 384, 385, 386, 356/387, 400, 401; 250/560, 561; 358/101, 106, 107

[56] References Cited

U.S. PATENT DOCUMENTS

| | | | |
|---|---|---|---|
| 2,406,299 | 8/1946 | Kovlicovitch | 250/561 |
| 3,724,958 | 4/1973 | Callan | 250/560 |
| 3,758,214 | 9/1973 | Mangelsdorf | 356/387 |
| 3,806,253 | 4/1974 | Denton | 356/386 |
| 4,171,744 | 10/1979 | Hubbard | 250/560 |
| 4,192,613 | 3/1980 | Hammar | 356/386 |
| 4,294,543 | 10/1981 | Apple et al. | 356/375 |
| 4,393,401 | 7/1983 | Gorenflo et al. | 356/401 |

FOREIGN PATENT DOCUMENTS 2067282 7/1981 United Kingdom ............... 356/401

Primary Examiner—R. A. Rosenberger
Attorney, Agent, or Firm—Antonelli, Terry & Wands

[57] ABSTRACT

An optical measurement technique enables optical signal processing apparatus to eliminate the effects of environmental noise during scanning of a workpiece, wherein successive optical slices through the workpiece are obtained. The image samples derived by the scanning optics may not properly line up with one another, where there is relative vibrational motion between the workpiece and the scanning optics. To overcome this problem a reference marker/correlation scheme effectively aligns each of the picture slices of the workpiece relative to a stored reference marker by correlation, so that the composite of the adjacent samples of the stem accurately represents a picture of the workpiece.

18 Claims, 9 Drawing Figures

REFERENCE MARKER/CORRELATION SCHEME FOR OPTICAL MEASUREMENTS

FIELD OF THE INVENTION

The present invention relates to optical measurement systems and is particularly directed to a scheme for precisely defining the image of an object being measured from a remote viewing system, wherein the object and imaging optics are subject to relative motion during the viewing process.

BACKGROUND OF THE INVENTION

For the purpose of evaluating physical characteristics of various types of workpieces, optical measurement systems are commonly employed. With continuing improvements to opto-electronic devices and semiconductor technology in general, such measuring systems become particularly attractive as they interface well with high speed signal processing systems, either in the form of particularly tailored hardware or suitably programmed data processors. One area where the need for accurate measurement systems is of paramount importance is the lumber processing industry, especially the sawmill, where the workpiece of interest constitutes a tree stem containing a variety of discontinuities along its surface, e.g. chips, branch stubs, burrs, knots, etc. With improvements in log processing algorithms, e.g. those designed to define the manner in which the log or stem should be cut for optimal monetary yield, which are implemented using on-site data processing equipment, it is preferred that the data defining the physical characteristics of the stem be both as accurate as possible and be available within as short a time as possible in order to optimize the stem processing efficiency of the sawmill.

Unfortunately, conventional optical schemes for measuring tree stem characteristics are cumbersome and subject to inaccuracies introduced into the measurement process by the very nature of the sawmill itself. For example, in the U.S. Pat. Nos. to Denton 3,806,253, Callani 3,724,958 and Hammar 4,192,613 there are described optical measurement apparatus wherein sets of optical sensor elements and light emitting elements are disposed on opposite sides of the log. The detectors may be comprised of photodiode arrays and the generation of an output by each sensor depends upon whether or not the log or stem intercepts the beam emitted by the emitting elements, so that the thickness of the stem may be represented by the number of light emitting elements whose output beams are not detected by an associated photodiode.

These types of systems suffer from a number of deficiencies, not the least of which is the fact that the environment of a sawmill is extremely noisy with effectively every component in the mill being subject to continuous strong physical vibrations. Because the measuring components move with respect to one another and the stem itself moves, the data obtained by the approaches described in the above cited patent literature is subjected to a significant degree of error. Moreover, the danger of damage to the opto-electronic components is substantial where the measuring optics are physically located adjacent to the stem handling apparatus.

SUMMARY OF THE INVENTION

In accordance with the present invention, there is provided an improved optical measurement technique that enables the optical signal processing apparatus to eliminate the effects of environmental vibration and to obtain a more accurate measurement of the physical characteristics of the workpiece, e.g. tree stem. In this regard, the optical scanning station may be positioned at a location remote from the log bed, thereby affording a greater immunity to damage from the log moving apparatus. In particular, the present invention is readily suited for use with an optical scanning system of the type described in a copending application by Warren H. Miller entitled "Focus Compensation Linkage" Ser. No. 303,136, filed Sept. 17, 1981 and assigned to the assignee of the present application.

In the optical scanning system described in the above identified application, a rotational scanning device is positioned to rotate about an axis orthogonal to and offset from the log deck along which the stem to be measured extends. As the rotational scanning device rotates about this axis, it sees a portion of the stem and adjacent background above and below the upper and lower edges (sides) of the stem. The image is focused upon a rectilinear photodetector (photodiode) array from which output signals representative of a picture slice through the stem are derived. By sampling the photodetector array outputs periodically as the scanning optics rotates there will be obtained successive sets of signals representative of adjacent picture slices of the stem, so that a composite arrangement of these signals may be employed to determine selected physical characteristics of the stem, e.g. centroids, diameters, etc. for optical lumber processing by a downstream computer.

Of course, because of the nature of the sawmill environment, the image samples derived by the scanning optics may not properly line up with one another, as there is relative vibrational motion between the log (deck) and the scanning optics during sawmill operation. The present invention overcomes this problem by a reference marker/correlation scheme that effectively aligns each of the picture slices of the stem relative to a stored reference grating or marker, so that the composite of the adjacent samples of the stem accurately represents a picture of the stem, stored data signals associated with which may be then processed to determine the physical characteristics of the log from which board yield may be established.

To this end, in accordance with the present invention, a reference grating or marker comprised of a set of randomly arrayed reflective and absorptive stripes is disposed on the log bed adjacent the position where a stem is located for viewing by the scanning optics. The reference marker extends the length of the bed to be viewed by the scanning optics, so as to encompass the range of stems to be measured thereby. As a result, at any time during a scan of a stem, an optical slice through the stem being scanned will also see the reference marker stripes.

Prior to optically processing any stem, in a quiescent state of the sawmill, the rotational scanning optics is caused to scan the log deck (absent any stem) and adjacent reference marker, and successive photodetector array output data samples associated with the reference marker are correlated with a digital copy of the reference marker stored in memory, in order to obtain a reference pattern to be used as a correlation reference for subsequent stem scanning. Typically, the photodiode array may be a 1K (1,024) element photodiode array, with the output of each photodiode being quantized into a prescribed number of bits for subsequent digital processing. Thus, as the scanning optics rotates and its field of view traverses the deck, the outputs of the elements of the photodiode array are successively sampled to produce sets of digital signals representative of optical slices through the deck and adjacent background, including the reference marker.

Because of vibrational noise in the sawmill, even during its quiescent state, successive optical slices through the deck and the reference marker can be expected to be offset or nonaligned with one another, so that the successively stored signal samples need to be modified in order to reflect proper alignment of the data. For this purpose, the data representative of that portion of each respective successive optical slice containing an image of the reference marker is correlated with the digital copy of the reference marker data previously stored in memory. Since the stripes of the reference marker are randomly distributed, the correlation will have a sharp peak when the two sets of data are aligned. Thus, in order to align a respective image with the stored reference data, each respective set of data obtained from a respective sampling position is shifted in a register or data storage memory and shifted memory contents are correlated with the stored reference data until the correlation reaches its maximum. At this point the background (i.e. the log deck, absent a stem, plus the reference marker) is properly aligned in the register or memory, so that during subsequent scanning of a stem on the log deck (and adjacent background including the reference marker) for successive correlations and alignments covering all the distributed sampling points along the log deck, there may be obtained an accurate composite of the stem. As a result, the edges of the stem (upper and lower edges as viewed by the scanning optics) may be defined, so that subsequent processing of the aligned data may afford a precise determination of the characteristics of the tree stem for optimal lumber processing.

DETAILED DESCRIPTION OF THE INVENTION

Before describing, in detail, the reference marker/correlation scheme of the present invention, a brief description of the general environment of the optical scanning apparatus with which the present invention may be associated, particularly as described in the above-referenced application, will be set forth in order that the application of the present invention to such a system may be more readily appreciated.

Figure 1:
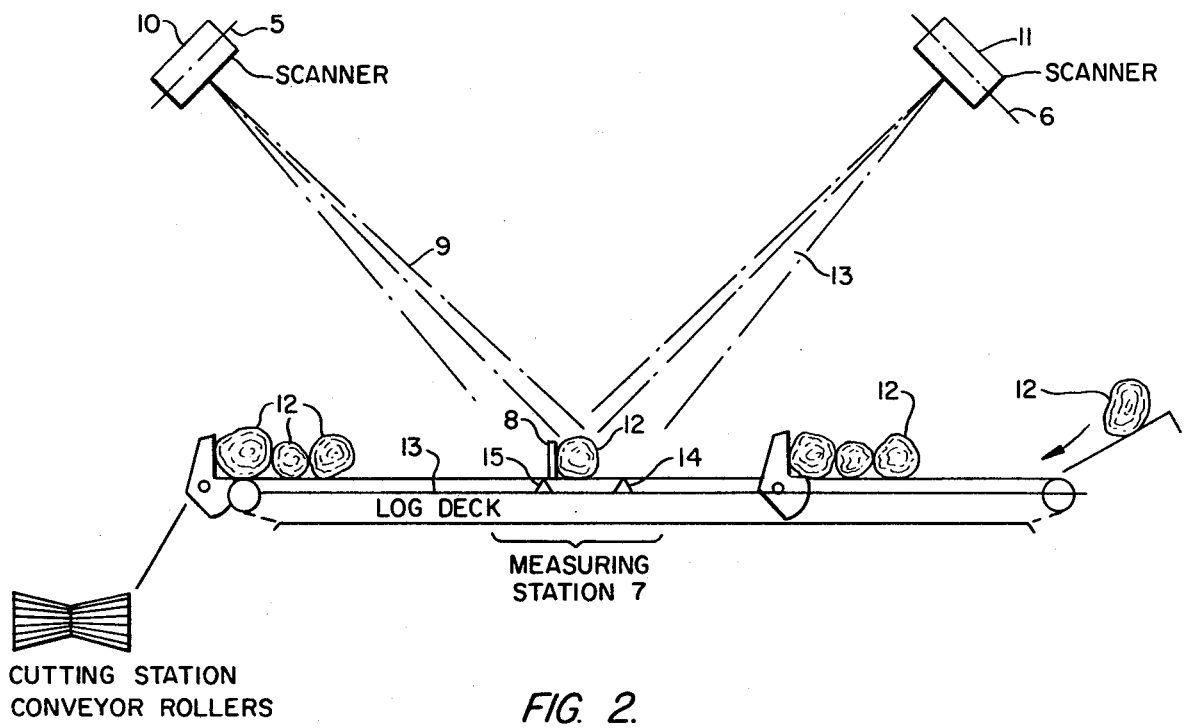
FIG. 1 is an end view of the arrangement of a pair of optical detectors and associated reference markers for scanning a tree stem.

Referring to FIG. 1, there is illustrated a tree stem measuring section of a sawmill wherein a plurality of logs or tree stems 12 are successively delivered to a measuring area 7 of a log deck 13. Subsequent to the measuring process at area 7 the stems are transported to a downstream merchandizer to a cutting station. As the details of the log transport and cutting systems are not necessary for an understanding of the present invention, they will not be described in detail. Instead, the present description will focus upon that aspect of the lumber processing scheme dealing with the optical measurement station.

When the stem has been delivered to the measurement area 7 of the log deck 13 it is in position to be optically scanned by a pair of scanners 10 and 11 respectively rotatable about axes 5 and 6. Scanner 10 has a field of view 9 which sees the stem and an area of adjacent background including a reference marker 14. Similarly, scanner 11 has a field of view 13 which sees the stem 12 and a reference marker 15. Each of scanners 10 and 11 may be configured as shown and described in the above-reference copending application with the field of view of each scanner being demagnified onto a rectilinear photodiode array from which signals representative of an optical slice through a scene of that portion of the stem seen by the scanner may be derived.

Figure 2:
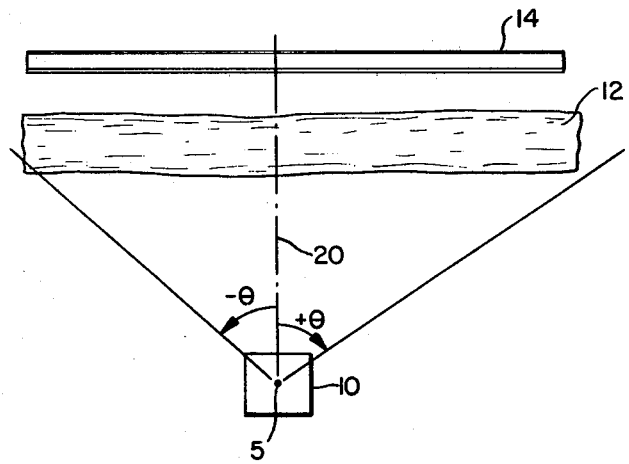
FIG. 2 is a side view of the position of a scanning optical detector relative to a tree stem.

A side view of the position of an individual scanner, for example scanner 10, relative to tree stem 12 disposed in measurement area 7, is shown in FIG. 2. Typically, a tree stem may be on the order of four inches to thirty inches in diameter and up to approximately sixty feet in length. Optical scanner 10 may be located on the order of thirty feet from the stem itself and is rotatable about axis 5 to sweep an arc ($\eta = \pm 45°$) of approximately 90° total, namely 45° to one side of the normal to the stem and 45° to the other side of the normal to the stem, thereby covering a distance that will accomodate the approximately sixty feet length of the stem. Within the optical scanner, the stripe-shaped photodiode array upon which an image of the stem is projected by a demagnifying lens system, effectively sees a narrow section or vertical image slice through the stem and adjacent background, including reference marker 14 as will be explained below in conjunction with the description of FIG. 3.

Figure 3:
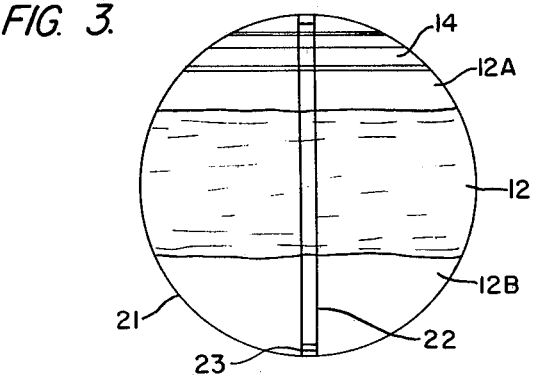
FIG. 3 illustrates an image within the field of view of an optical detector.

FIG. 3 shows an exemplary image of the field of view of the scanner 10 and a narrow portion of the image associated with a rectilinear or stripe-shaped photodiode array which effectively views a vertical optical slice through the stem and adjacent background. Namely, the field of view of the scanner is basically a circular field of view 21. A portion of the stem 12 is seen within the field of view of the scanner together with adjacent background areas 12a and 12b which occupy the remainder of the field of view adjacent the opposite edges of the stem. A demagnifying lens within the scanner 10, focusses the image (stem and background, including reference marker 14) onto a narrow or stripe-shaped photodiode array, an individual photodiode of which is represented by segment 23. For a rectilinear photodiode array (for example one having 1,024 elements), the outputs of the respective diodes will represent a slice or stripe-shaped image 22 of the field of view.

Figure 4:
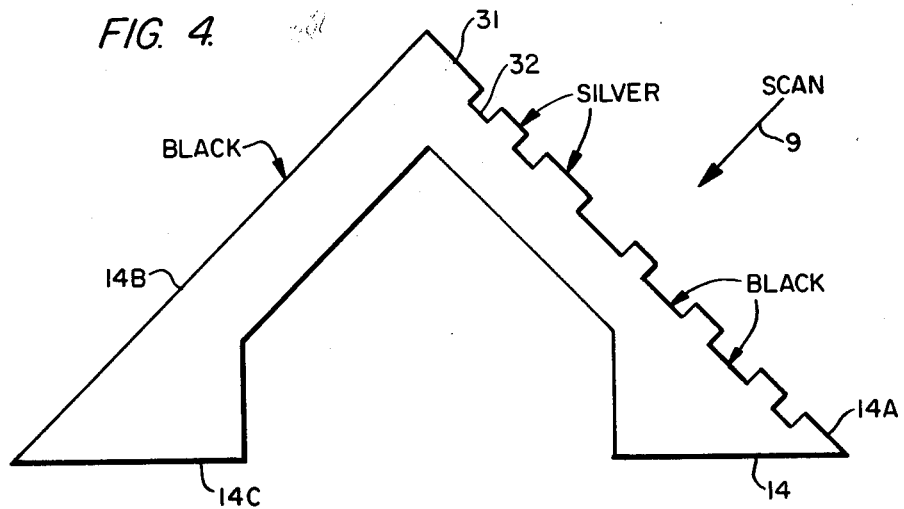
FIG. 4 is a side view of an individual reference marker.

Near one edge of the stem image is the image of a set of randomly arrayed stripes of the reference marker 14, a side view of which is shown in FIG. 4, to be used for image alignment in accordance with the present invention as will be explained in more detail below. Reference marker 14 is affixed to the log deck in the viewing area of the measuring station, so that each time a tree stem is scanned the reference marker is likewise scanned. As shown in FIG. 4, reference marker 14 has a front face 14A comprised of a random arrangement of highly reflective (e.g. silvered) sections 31 and a highly absorptive (e.g. black) sections 32, and a black back face 14B. The bottom face 14C of reference marker 14 is affixed to log deck 13 by screws or the like. Reference marker 14 is affixed to log deck 13 so that the randomly arrayed stripes 31 and 32 face or are directly in the field of view 9 of scanner 10.

Figure 5:
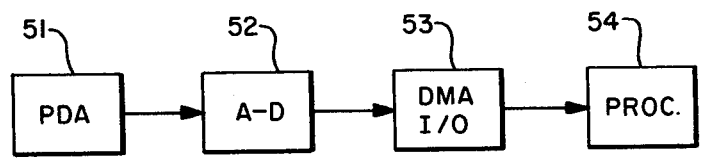
FIG. 5 is a general block diagram of an image/data processor system.

Referring now to FIG. 5 there is shown a general block diagram of the overall signal processing system embodying the present invention, the details of the image-representative data alignment functions of which, that are preferably processor-implemented, being described below in conjunction with the flow charts shown in FIGS. 8 and 9. The rectilinear photodiode array 51 shown located within the optical scanner is coupled to an analog-digital converter 52, which periodically samples the output of the photodetector array as the scanning system, such as that described in the above-referenced copending application, rotates about its axis and scans the tree stem of interest. The pixel data for each respective photodiode is quantized into a prescribed number of bits by the A/D converter and coupled to a signal storage memory within processor 54. The coupling is carried out through a conventional direct memory access interface unit 53 which is disposed between the analog-digital converter 52 and the processor 54. Processor 54 is shown as a unitary element; however, it should be understood that it contains, as is common practice, random access memory, read only memory and a central processing unit interconnected with each other via address, control and data bus communication links. Since the individual units of which the block diagram shown in FIG. 5 are conventional and do not require a detailed description for an understanding of the present invention, they will not be described here. Rather, the description to follow will focus upon the sequence of operations carried out within the processor which enable the individual slices that are produced during the successive sampling of the photodiode array outputs as the optical scanner sweeps the tree stem to be aligned with one another and applied to further stem processing operations.

Figure 6:
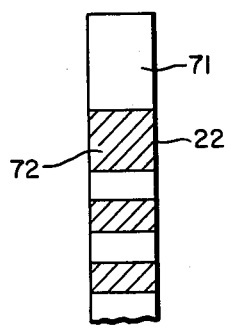
FIG. 6 shows photodiode element outputs for a portion of a photodiode array.
Figure 7:
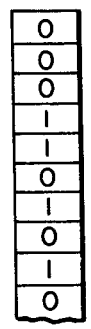
FIG. 7 shows digital data associated with the photodiode element output of FIG. 6.

FIG. 6 illustrates a portion of the optical slice seen by the photodiode array, namely a plurality of adjacent photodiode elements upon which a portion of the reference marker is imaged. In FIG. 6, the light or non-shaded areas correspond to the highly reflective or silvered areas 31 of the reference marker shown in FIG. 4, while the dark shaded areas correspond to the light absorptive or blackened areas 32 of the reference marker. As was mentioned previously, this pattern of light and dark areas may be considered to be a random series of digital bits (as represented by light and dark areas of optical reflection and absorption) which will be used for alignment purposes within the processing equipment. Preferably, the 1,024 data words for each optical slice that are stored in memory are compared with some threshold level or applied to a mask algorithm to reduce the number of grey tones to binary 1 to 0 representations. This is shown in FIG. 7 wherein the light and dark areas of the image observed by the photodiode array have been identified as either 0s or 1s. Thus, within the processor memory, there will be stored, for each optical slice, an image word made up of 1,024 bits containing a series of 0s and 1s. For that portion of the optical slice which images the references marker, the zero and one pattern will correspond to the random pattern of light and dark areas of the reference marker 14 shown in FIG. 4, described previously.

The reference marker itself is of a well defined physical size such as a five inch width that runs along the length of the log bed and within which five inch width the light and dark stripes of the marker are contained. If the unit width is on the order of one half inch, then for a five inch width there are ten defined areas which are either absorptive or reflective. The imaging optics may be such that the width of the reference marker and adjacent boundary on either side thereof may be imaged upon some selective number of the 1,024 photodiodes. For purposes of the present description, let it be assumed that the reference marker falls within the field of view of 64 photodiodes at one end of the photodetector array. This is not to say that the five inch width of the reference marker fills the field of view of the 64 photodiodes, but rather falls within the field of view of some number less than the 64 selected with a prescribed number at each end of the group of 64 to permit vibration of the log bed and reference marker relative to the scanner within defined tolerances. Thus, the number of photodiodes chosen to view the reference marker is sufficient to permit whatever degree of vibration is to be encountered.

Figure 8:
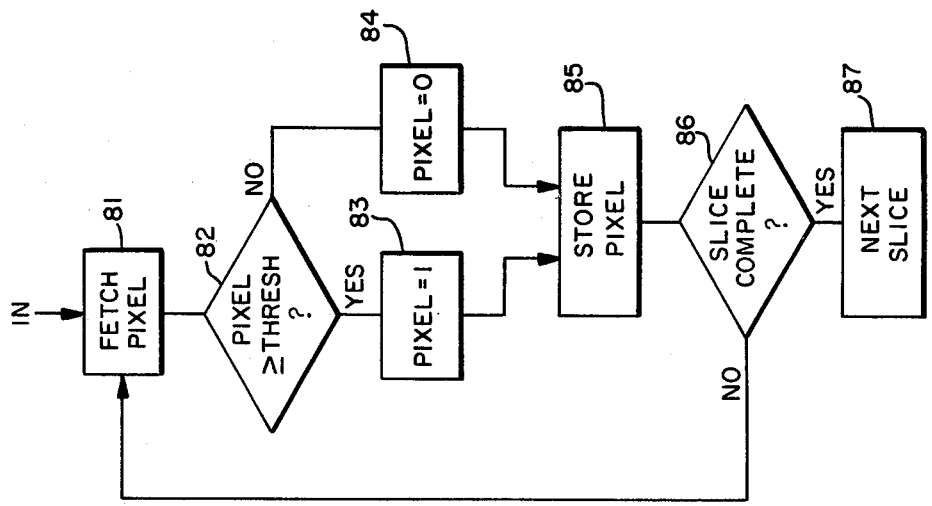
FIG. 8 is a flow chart for converting the picture element ("pixel") data of FIG. 6 to the binary data of FIG. 7.

As was mentioned previously, prior to aligning the individual image slices, various grey tones of the pixels of the photodiode array are compared with some threshold or applied to a masking algorithm including a threshold to reduce the grey tones to simple binary format, FIG. 8 illustrates a flow chart for carrying out a simplified conversion process. For an individual slice, each pixel, beginning at the pixel at one end of the photodiode array and continuing on to the other end of the photodiode array in sequence, is fetched in step 81. The data representative of the pixel grey area obtained from memory in step 81 is compared with a threshold in step 82. If the value of the data exceeds the threshold the pixel is identified as a binary 1 in step 83. On the other hand, if the value of the pixel data does not exceed the threshold in step 82, the pixel is identified as a 0 in step 84. The thus-identified pixel, either a 1 or a 0, is then stored in a pixel memory via step 85 for that particular slice, a picture illustration of a portion of which is shown in FIG. 7, described previously. Subsequent to storage of that pixel bit, the process inquires as to whether the pixel of interest is the last pixel in the slice in step 86. If the slice is not complete, then the next pixel is fetched from memory in step 81 and the process is repeated. Eventually, when the last or 1,024th pixel has been converted into a simple binary format, the process proceeds to step 87 and the next slice is processed. This procedure continuous a slice at a time along the length of the log bed until the entirety of the scene has been processed.

With the memory now containing a sequence of binary words of 1,024 bits each, each corresponding to a respectively adjacent optical slice, the processor proceeds to carry out the alignment of the individual pixels.

It should be recalled that each pixel memory word not only contains data corresponding to the reference marker, but contains other data corresponding to characteristic features of a tree stem. Since it is principally these other features (i.e. the tree stem) which are to be aligned with one another for subsequent analysis, but the features of which are presently unknown, the processor operates on those features which are known, specifically the random pattern contained within the reference marker, a mathematical copy of which is stored in memory.

Namely, stored within memory are a set of reference words which are to be used to define the location of those portions of each pixel word containing the reference marker data. Since the stored reference words are all aligned with one another, all that needs to be done is to correlate each stored reference word with that portion of each optical slice that contains the reference marker data and, from the correlation, determine whether the image slice should be translated along the optical slice to obtain alignment.

Figure 9:
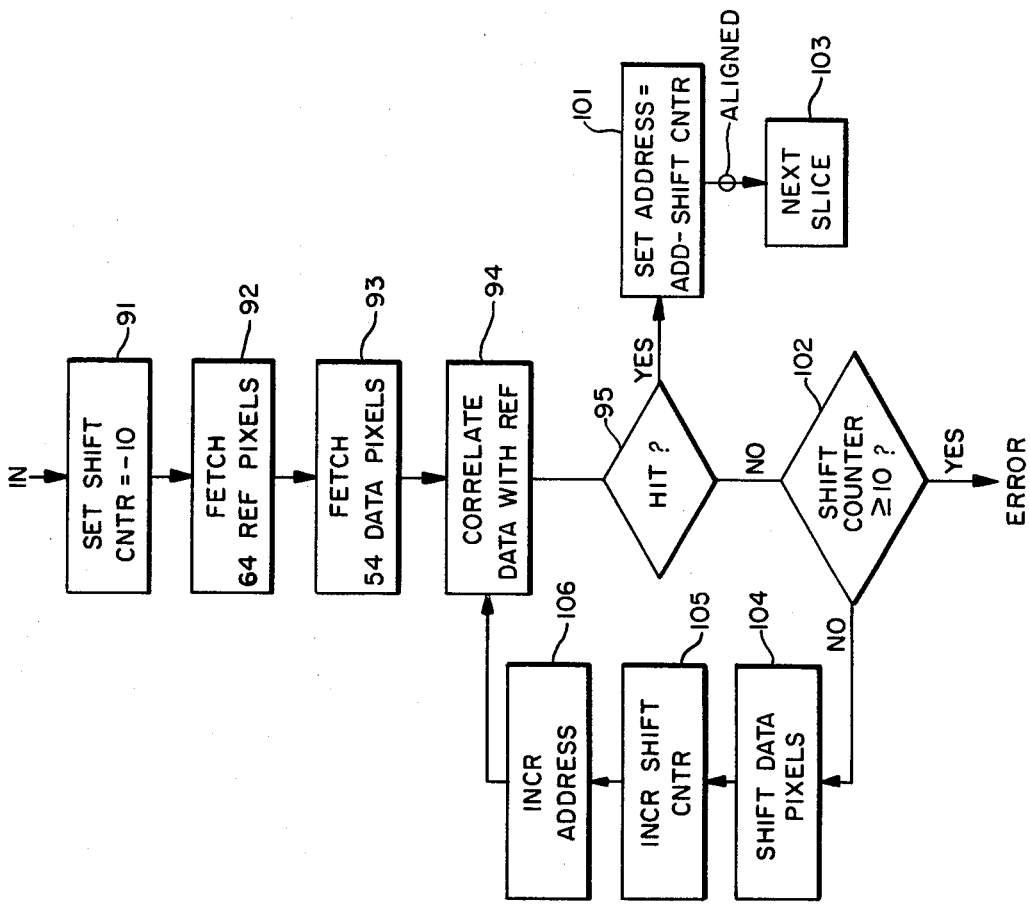
FIG. 9 is a flow chart of the image-reference master correlation scheme for obtaining pixel image alignment.

FIG. 9 illustrates a flow chart of the steps that are carried out within the processor for accomplishing this task. Initially, a "soft" shift counter in the processor is decremented by prescribed value or loaded with an initial value which causes a relative offset or shift between the stored reference data and the data representative of the image of the reference marker contained in the optical slice of interest. This deliberate offset is defind so as to encompass the maximum degree of image displacement that can result from the vibration of the sawmill equipment. As a result, for subsequent shifting the data representative of the image slice toward the data representative of stored reference marker there can be expected to occur a position at which the two sets of reference marker data attain a peak value for mutual correlation. Here, for purposes of explanation, let it be assumed that the soft shift counter is decremented or loaded with a value minus 10, corresponding to 10 pixel positions. Next, from the reference memory, the 64 reference pixel values (each of which is either a 0 or 1 is defined by the stored reference marker) is fetched from memory in step 92. In step 93 the data values obtained from the pixel elements for the slice of interest are fetched to be compared with the 64 reference pixel values fetched in step 92. However, as described previously, the data values of the reference marker-containing portion of the optical slice of interest which are stored in memory are of a number sufficient to encompass the reference marker and the value chosen is less than that stored in the reference marker memory in order to permit a shifting of the two sets of data with respect to one another to achieve alignment. The 54 pixels which are fetched from memory in step 93 may be stored in a reference shift register the contents of which may be selectively shifted until alignment is achieved, as we explained below.

The two reference marker-containing words that have been fetched from memory, namely that of the reference marker previously stored and that of image data containing reference marker information as seen by the scanning optics, are correlated with one another in step 94. The value of the correlation is then compared with a threshold, which is preferably established to determine whether or not there is true alignment between the image data and the stored reference marker. If the threshold is exceeded, then, in step 95 a hit or recognition of the alignment is identified. In this regard, it is to be recalled that a random digital pattern when correlated with itself will have a peak when the two patterns are aligned i.e., effectively equated with one another on a bit by bit basis. On the other hand, a periodic pattern will not have such a sharp peak since the pattern will be aligned at a number of different locations. For this reason, a random pattern is chosen for the reference marker. The correlation peak has a corresponding threshold used in the decision step 95. If the image pattern and the stored reference marker are not aligned with one another, then the contents of the shift counter are examined to determine whether or not its contents have been shifted by a prescribed value, here 10 bits, in step 102. Step 102 is essentially an error indicating step in that if no alignment was detected after the contents of the shift register containing the fetched image data have been shifted by some prescribed value, which should bring the reference marker and the image data into alignment with one another, then an error is indicated. If no error is indicated in step 102, and a hit has not yet occurred, namely the reference marker stored in memory and the image data containing the reference marker and the adjacent stem image are not aligned with one another, the shift register containing the image pixel data is shifted in step 104 and the soft counter is imcremented in step 105.

In addition, the address register by way of which pixel data for the slice of interest is accessed by the processor is incremented in step 106. The purpose of step 106 is to simplify the manner in which the processor accesses this data from the memory segment containing data representative of an optical slice. Rather than shift the contents of the memory to bring the image data into alignment with one another, it is a simple matter to reference, for each slice, an address index modifier associated with that optical slice by way of which memory is addressed. Subsequent to step 106, the newly shifted contents of the shift register containing the image data is again correlated with the reference marker data in step 94. Eventually through this series of steps, a hit is declared in step 95 indicating that there is an alignment between the reference marker data whose true location is known and the image data the location of which was initially unknown but is now presently known as correlation alignment has been indicated and address index has been modified to specify the number of pixels that have been shifted to obtain alignment, so that future accessing of the contents of the pixel memory can be obtained by referencing the address index for each slice. This procedure is indicated in step 101 in which the address register is modified by the address index or contents of the shift counter. Once an alignment has been achieved, the process then proceeds to the next slice in step 103. The above procedure is carried out until each slice has been processed, so that within memory all of the data corresponding to respective optical slices through the tree stem and adjacent background (including the reference marker) are effectively aligned with one another and the stem image data may be processed for determining its physical characteristics.

It should be observed that the foregoing procedure applies not only to the processing of tree stems but to any type of workpiece in general wherein the workpiece is examined from a remote optical scanning station and the scanning station and the workpiece are subject to relative vibration or other types of environmental noise during the scanning and data storage operations.

In this regard, as mentioned previously, prior to optically scanning a workpiece (e.g. stem) an initial scan of the workpiece holder (background, e.g. log deck) may be carried out. The purpose of this scan is to permit subsequent processing of the stem data to remove background image data, thereby leaving only an outline of the stem. This procedure is more fully described in copending application Ser. No. 303,138 filed Sept. 17, 1981 entitled "Log Surface Determination Technique" by Wilson E. Taylor, and assigned to the assignee of the present application. Suffice it to say, for purposes of the present description, that prior to scanning the workpiece proper, the background and adjacent reference marker are considered the workpiece or object of interest and data representative of the successive optical slices therethrough is aligned with the digital copy of the reference marker stored in memory. This guarantees that the data representative of the image of the reference marker is aligned in memory and it may be used for subsequent scans as the alignment reference in place of the original mathematical copy. Since the data also includes adjacent background (now also properly aligned) this background data may be used to refine the workpiece data.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. A method for establishing the position of an image of an object with respect to a reference image position wherein the object and an optical detector through which the image is obtained are subject to relative motion, comprising the steps of:
   (a) providing, adjacent to said object, a reference pattern, to be viewed by said optical detector during the generation of an image of said object, so that an image of said reference pattern is also generated thereby;
   (b) storing first data representative of a known position of said reference pattern;
   (c) comparing second data representative of said image of said reference pattern with said stored first data to determine whether or not said first and second data are aligned with one another; and
   (d) adjusting said second data representative of said image of said reference pattern relative to said first data until the comparison step (c) indicates that said first and second data are aligned with one another, whereby the position of the image of said object is established with respect to said reference image position.

2. A method according to claim 1, wherein said reference pattern comprises a random data pattern and step (c) comprises the step of correlating said first data and second data until the result of the correlation produces a value in excess of a prescribed threshold, thereby indicating effective alignment between said first and second data.

3. A method according to claim 1, wherein said reference pattern comprises a random arrangement of relatively reflective and non-reflective indicia provided along the length of said object affixed to a structure by way of which said object is supported for viewing by said optical detector.

4. A method according to claim 1, wherein said reference pattern is comprised of a plurality of adjacent portions thereof and wherein step (b) comprises storing, as said first data, data representative of respective replicas of said plurality of adjacent portions of said reference pattern in alignment with one another.

5. A method according to claim 1, further including, prior to step (a), the steps of:
   (a-1) providing said reference pattern at the position thereof provided in step (a) and viewing said reference pattern with said optical detector so as to generate an image of said reference pattern absent said object;
   (a-2) storing third data representative of a known position of a known position of said reference pattern;
   (a-3) comparing fourth data representative of the image of said reference pattern obtained in step (a-1) with said stored third data to determine whether or not said third and fourth data are aligned with one another;
   (a-4) adjusting said fourth data relative to said third data until step (a-3) indicates that said third and fourth data are aligned with one another, whereby the position of the image of said reference pattern is established with respect to said known position of said reference pattern; and
   (a-5) generating said first data to be stored in step (b) in accordance with the alignment of said third and fourth data carried out in step (a-4).

6. A method of aligning a plurality of images of adjacent portions of an object so as to obtain a composite image of said object comprising the steps of:
   (a) providing, adjacent to said object, a reference pattern, to be viewed by an optical detector through which said plurality of images of said adjacent portions of said object are generated, so that a respective image of said reference pattern accompanies the image of a respective adjacent portion of said object;
   (b) storing first data representative of a known position of said reference pattern for each viewing position of said object by said detector;
   (c) for each respective image of an adjacent portion of said object, comparing second data representative of the respective image of said reference pattern with stored first data associated with that respective image position, to determine whether or not said first and second data are aligned with each other;
   (d) adjusting, for each respective adjacent image position, said second data representative of the respective image of said reference pattern relative to said first data until the comparison step (c) indicates that said first and second data are aligned with one another, whereby the position of the image of each respective adjacent portion of said object is established with respect to the location of said reference pattern.

7. A method according to claim 6, wherein said reference pattern comprises a random data pattern and step (c) comprises the step of correlating said first data and second data until the result of the correlation produces a value in excess of a prescribed threshold, thereby indicating effective alignment between said first and second data.

8. A method according to claim 7, wherein said object comprises a tree stem disposed on a log platform and said optical detector scans said tree stem and said reference pattern during which its output is periodically sampled to produce said plurality of images of adjacent portions of said stem and said reference pattern.

9. A method according to claim 8, wherein each of said plurality of images corresponds to an imaginary slice through said tree stem and said reference pattern in a direction substantially orthogonal to the length of said tree stem.

10. A method according to claim 6, wherein said reference pattern comprises a random arrangement of relatively reflective and non-reflective indicia provided along the length of said object affixed to a structure by way of which said object is supported for viewing by said optical detector.

11. A method according to claim 6, wherein said reference pattern is comprised of a plurality of adjacent portions thereof at respective viewing positions of said object by said detector, and wherein step (b) comprises storing, as said first data, data representative of respective replicas of said plurality of adjacent portions of said reference pattern in alignment with one another.

12. A method according to claim 11, wherein an image of a respective portion of said reference pattern is digitally encoded as said second data, said data representative of a respective replica of an adjacent portion of said reference pattern is digitally encoded as said first data and step (d) comprises successively shifting said first data relative to said data until said comparison step (c) indicates that said first and second data are aligned with one another.

13. A method according to claim 11, wherein said reference pattern comprises a random arrangement of relatively reflective and non-reflective indicia provided along the length of said object affixed to a structure by way of which said object is supported for viewing by said optical detector.

14. A method according to claim 13, wherein said object comprises a tree stem disposed on a log platform and said optical detector scans said tree stem and said reference pattern during which its output is periodically sampled to produce said plurality of images of adjacent portions of said stem and said reference pattern.

15. A method according to claim 14, wherein each of said plurality of images corresponds to an imaginary slice through said tree stem and said reference pattern in a direction substantially orthogonal to the length of said tree stem.

16. A method according to claim 11, wherein an image of a respective portion of said reference pattern is derived from a plurality of photodetectors arranged substantially rectilinearly adjacent to one another and whose outputs are digitally encoded to provide said second data.

17. A method according to claim 6, further including, prior to step (a), the steps of:

(a-1) providing said reference pattern at the position thereof provided in step (a) and viewing adjacent portions of said reference pattern with said optical detector so as to generate a plurality of respective images of adjacent portions of said reference pattern absent said object;

(a-2) storing third data representative of a known position of each adjacent portion of said reference pattern for each respective viewing position of said object by said detector;

(a-3) for each respective image of an adjacent portion of said reference pattern comparing fourth data representative of the respective image of a portion of said reference pattern obtained in step (a-1) with said stored third data to determine whether or not said third and fourth data are aligned with one another;

(a-4) adjusting said fourth data relative to said third data until step (a-3) indicates that said third and fourth data are aligned with one another, whereby the position of each respective image of an adjacent portion of said reference pattern is established with respect to said known position of a corresponding adjacent portion said reference pattern; and (a-5) generating said first data to be stored in step (b) in accordance with the alignment of said third and fourth data carried out in step (a-4).

18. A method according to claim 6, wherein each of said plurality of images corresponds to an imaginary slice through said object and said reference pattern in a direction substantially orthogonal to the direction along which said adjacent portions of said object occur.

* * * * *